May 13, 1924.
J. F. COLLINS
1,493,736
VEHICLE FRAME
Filed June 27, 1923
3 Sheets-Sheet 1
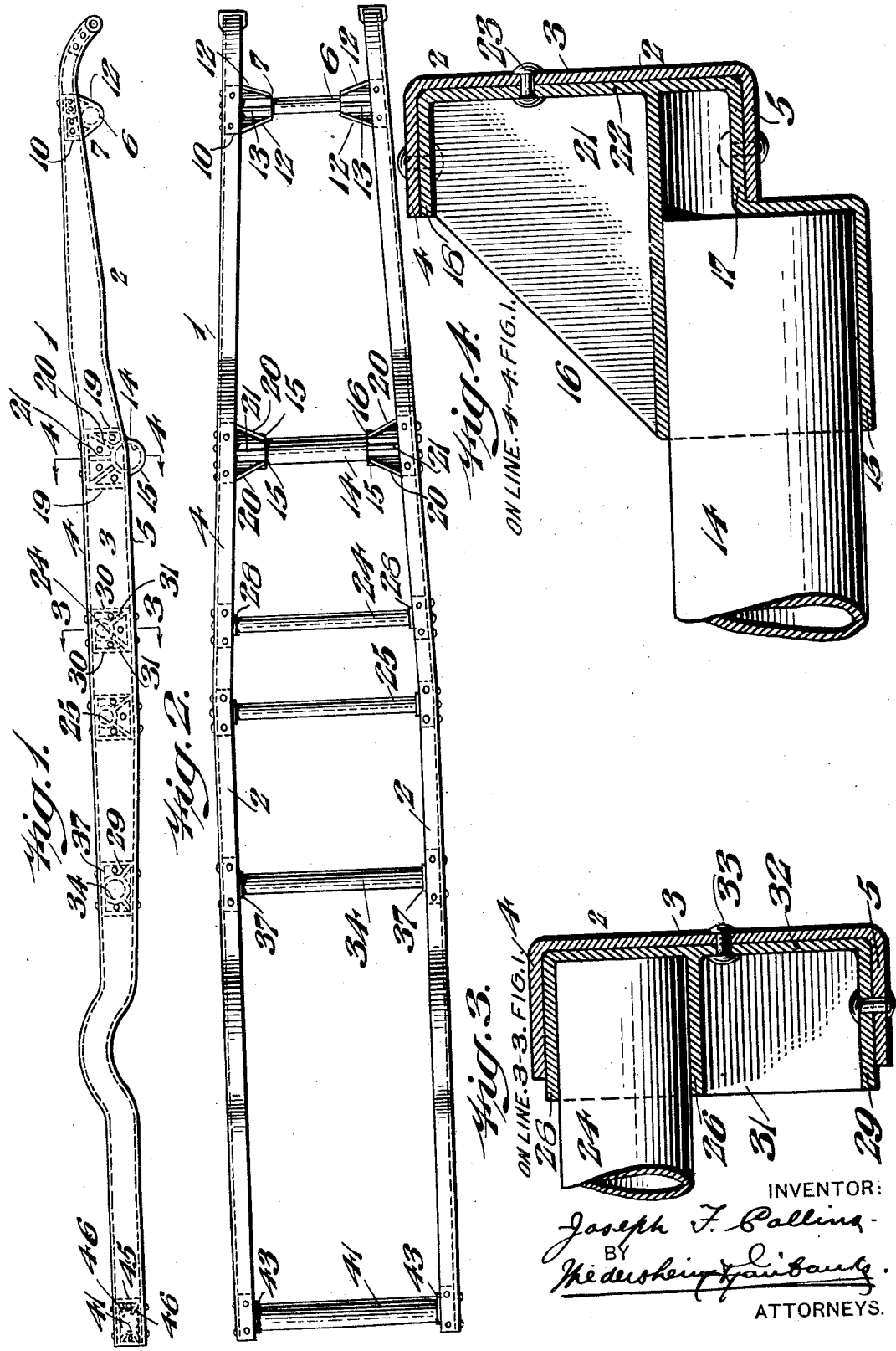
INVENTOR:
Joseph F. Collins
BY
Wiedersheim & Fairbanks
ATTORNEYS.

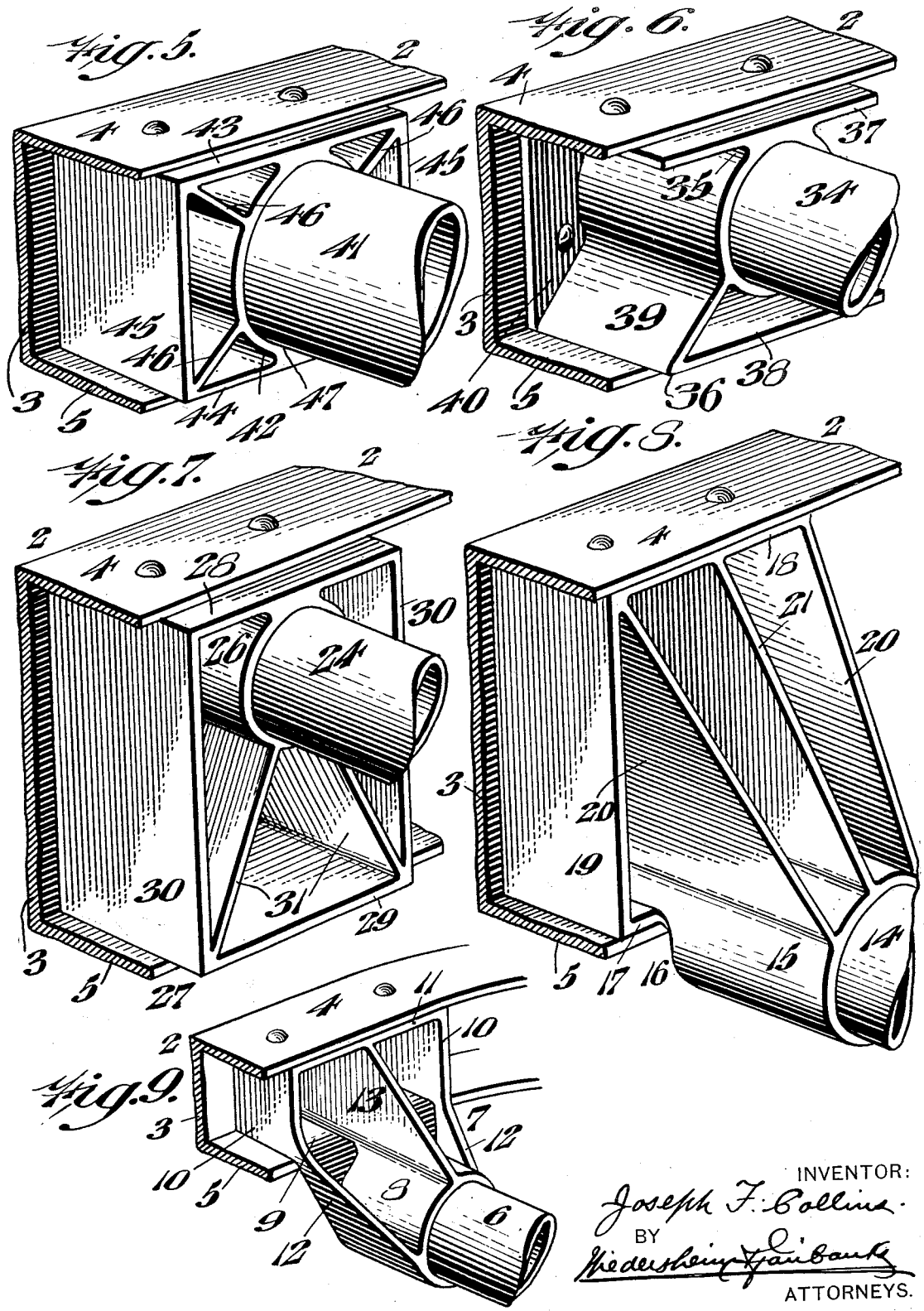

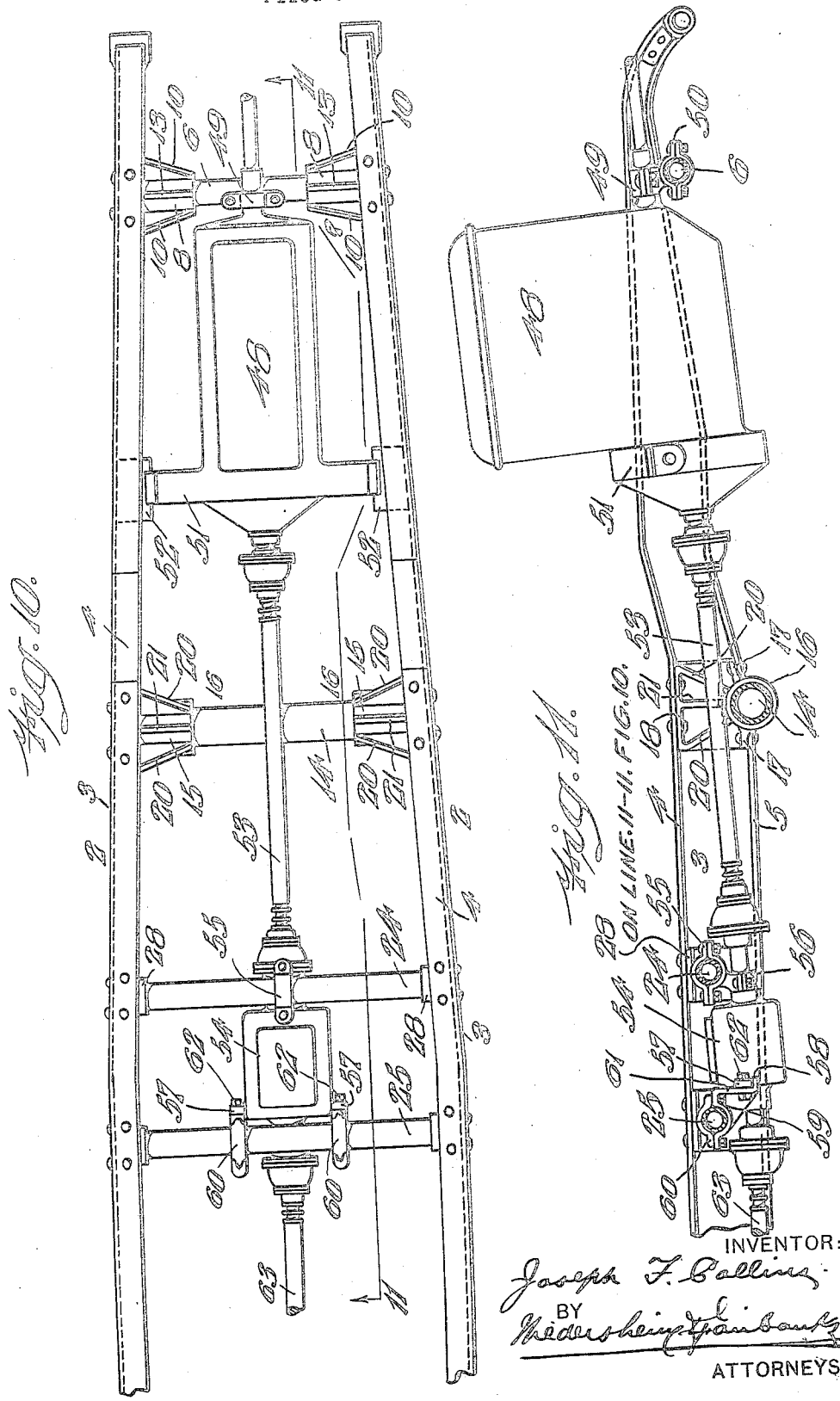

Patented May 13, 1924.

1,493,736

UNITED STATES PATENT OFFICE.

JOSEPH F. COLLINS, OF DREXEL HILL, PENNSYLVANIA, ASSIGNOR TO MITTEN-TRAYLOR INCORPORATED, A CORPORATION OF DELAWARE.

VEHICLE FRAME.

Application filed June 27, 1923. Serial No. 647,959.

*To all whom it may concern:*

Be it known that I, JOSEPH F. COLLINS, a citizen of the United States, residing at Drexel Hill, county of Delaware, State of Pennsylvania, have invented a new and useful Vehicle Frame, of which the following is a specification.

My invention relates to a novel construction of a vehicle frame, adapted for motor busses, trucks, automobiles, trackless trolleys, rail cars and the like and my object is to stiffen the frame, so that when the wheels rise and fall in traveling over obstructions in the highway, the frame will not distort, which will force the springs to equalize these thrusts from the road and save the rocking of the body construction.

This condition of the liability of twisting the body construction is present to a greater or less degree in all conventional vehicle frames as commonly constructed on account of using pressed steel cross members, and in lieu of these, I employ tubular cross members immovably secured to the side rails or channels by brackets of a novel construction, so that at each point of contact my novel construction has a two fold function. First it resists the disalignment of the side rails with regard to each other in plan view and secondly, it resists the liability of vertical disalignment of said side rails with regard to each other, so that my novel frame is prevented from vertical or horizontal distortion.

The transverse tubes or cylinders also act as supports for the engine, transmission and the other devices and adjuncts necessary to the chassis, and these tubes can further be used as storage space for cylinder oil or as emergency gas tank or as storage for other liquids, or commodities.

To the above ends my invention consists of a novel construction of a vehicle frame composed of side rails of channels tied together at suitable intervals by transverse tubular members, whose ends are seated in brackets of a novel construction, which are riveted or otherwise secured to or between the inwardly turned flanges of said channels, said tubular transverse members being preferably of varying diameters to resist the varying shocks or thrusts to which said frame is liable at various points, so that the entire frame functions as a rigid unit and is incapable of distortion in vertical or horizontal planes.

It further consists of a novel vehicle frame of the character aforesaid, wherein the transverse tubular members are so collocated and spaced apart as to afford supports for the engine, transmission and their adjuncts for the vehicle to which the frame is applicable.

It further consists of other novel features of construction and advantage, all as will be hereinafter pointed out.

Figure 1 represents a side elevation of a vehicle frame embodying my invention.

Figure 2 represents a plan view of the frame seen in Figure 1.

Figure 3 represents on an enlarged scale, a section on line 3—3 Figure 1.

Figure 4 represents on an enlarged scale, a section on line 4—4 Figure 1.

Figures 5, 6, 7, 8 and 9 represent on an enlarged scale, perspective views of the various forms of brackets employed in conjunction with the side rails, and transverse tubular members.

Figure 10 represents on an enlarged scale, a plan view of the front of the vehicle frame seen in Figure 1, showing the manner of positioning and supporting the engine, transmission and their adjuncts.

Figure 11 represents a longitudinal vertical section on line 11—11 Figure 10.

Similar numerals of reference indicate corresponding parts.

Referring to the drawings:—

1 designates my novel construction of vehicle frame, the same comprising the side rails or channels 2, which are duplicates and may be made of pressed steel or rolled shapes or otherwise formed. Each channel is composed of the vertical web 3 and the top and bottom inwardly turned flanges 4 and 5. These side channels may be parallel or arranged so as to converge at their front ends and, if desired, said channels can be of equal depth throughout and straight from end to end, although in practice, I prefer to employ substantially the shape shown in Figure 1, as it lends itself to the use to which my novel frame is intended, as for motor coaches, busses, trucks, automobiles, trackless trolleys, rail cars and the like.

In carrying out my invention I employ in conjunction with the side rails a plurality of transverse tubular members, which are so positioned at intervals throughout the length of the frame, that the latter is rendered entirely free from distortion in longitudinal or vertical planes due to the inequalities of the road, which forces the springs to function instead of the frame distorting and twisting the body.

In addition by my novel construction, I am enabled to utilize certain of my novel transverse tubular members for supporting the different elements necessary in operating and propelling the vehicle, such as the engine, transmission and their adjuncts.

Referring to the right hand ends of Figures 1, 2, and 9. 6 designates the front tubular transverse members, whose ends are immovably secured by brazing, welding, pinning or keying or any other means in brackets 7, whose construction will be apparent from Figure 9. Each bracket has the tubular seat 8 in which the end of the tube 6 is received, said seat being integral with the bracket body, which is composed of the base 9, the upright side walls 10 and the top wall 11.

The base 9 and the top wall 11 are riveted or otherwise secured to the top and bottom flanges 4 and 5, and the bracket is stiffened and reinforced by the outer webs 12 and the central web 13, which are common to the seat 8 and the bracket body, as seen in Fig. 9.

This front transverse tubular member 6 is in practice about three inches in diameter and may be of seamless steel tubing, cast or wrought-iron pipe, aluminum or bronze tubing or of other material.

The brackets 7 may be of cast steel, malleable iron, bronze or drop forgings. The next transverse tubular member 14, is about five inches in diameter, and its ends are secured in tubular seats 15 of brackets 16 best seen in Figs. 4 and 8, said brackets comprising the base 17, the top 18, and the sides 19. The outer webs 20 and the central web 21 common to the seat 15 and the bracket body give strength and rigidity to the structure and the top and bottom walls 18 and 17 are riveted or otherwise secured to the top and bottom flanges 4 and 5 as will be understood from Figs. 4 and 8.

The top and bottom members 18 and 17 are joined by the rear wall 22, which is riveted to the web 3 at the points 23, as will be understood from Fig. 4, so that an extremely rigid and durable structure is produced, as is evident.

24 and 25 designate the two central, transverse, stiffening, tubular members and as these and their brackets are duplicates, a description of one will suffice for both. The tube 24 has its ends seated in the seats 26 in the brackets 27, which are composed of the top and bottom walls 28 and 29 and the side walls 30, said seats being stiffened by the upwardly converging webs 31, (see Figs. 3 and 7). The top and bottom walls 28 and 29 are riveted to the top and bottom flanges 4 and 5, as seen in Figs. 3 and 7 and the members 24 and 25 are in practice about 3 inches in diameter.

32 designates a vertical web joining the top and bottom member 28 and 29 (see Fig. 3) which is riveted at 33 to the web 3.

34 designates the next transverse, tubular member whose ends are secured in the seats 35 of the brackets 36 (see Fig. 6) which are provided with the top and bottom walls 37 and 38 which are riveted to the top and bottom flanges 4 and 5, as seen in Fig. 6, the bottom wall 38 having the upwardly converging webs 39, and the back vertical web 40, which is riveted to the web 3 (see Fig. 6).

The tubular member 34 is about 4 inches in diameter in practice. The rear transverse, tubular member, 41 is in practice about 4 inches in diameter and its ends are seated in the brackets 42, having the top and bottom walls 43 and 44, and the side walls 45 and from the meeting points of said walls extend the radial webs 46 to the central seat 47. The top and bottom walls 43 and 44 are riveted to the top and bottom flanges 4 and 5, as will be understood from Fig. 5.

48 designates the engine of the self propelled vehicle, to which my novel frame is applicable, the front of said engine being secured in position by the upper transverse straps 49, which are secured to the lower clamps 50, (see Fig. 11) which are bolted to the front transverse tubular member 6. The rear of the engine 48 has the transverse strap or bar 51, secured thereto with its ends interlocked in the blocks 52 (see Fig. 10.) and from the rear of the engine extends the propeller shaft 53 (provided with the usual adjuncts and appurtenances, which it is not necessary to describe) which leads to the transmission 54 which may be of any conventional type.

It will be noted from Figs. 10, and 11 that the transverse tubular members 24 and 25 are so collocated or spaced apart that the transmission case can be nicely fitted therebetween and its front can be secured in position by the upper clamps 55, which are connected to the lower straps 56, as will be understood from Figs. 10 and 11.

The upper clamps engage the transverse tubular member 24 and a very rigid construction, which is readily accessible is produced, as is evident. The rear of the transmission case 54 is provided with the rear transverse lugs 57 which seat on the lower horizontal terminal flanges 58 of the lower clamping member 59, which engages the under side of the tubular member 25 and is clamped thereto by the upper clamping member 60. The upright member 61, is common to the clamping member 59 and the terminal 58 and the lugs 57 are bolted to the uprights 61 by the bolts 62. There are two of the clamping members 59 and 60 employed as will be understood from Fig. 10 and by novel construction the transmission and its adjuncts is securely fastened in position, so as to form a unitary construction with the transverse members 24 and 25 and the side rails or channels 2.

It will be apparent from Fig. 11, that by my novel construction of brackets, and the collocation of the transverse tubular members therewith, the front tubular member 6 and the next tubular member 14 are dropped down sufficiently so as to enable the front propeller shaft 53 to readily clear the members 6 and 14. By raising up the members 24 and 25, into the position seen in Fig. 11, I provide sufficient clearance, so as to permit the proper positioning of the transmission 54 and the rear propeller shaft, so that all the driving mechanism will properly align under all conditions. I am aware that it has been heretofore proposed to employ transverse tubular members at the front and rear ends of a frame having their ends engaging internally splined bosses, but my device is differentiated from said prior constructions, since I employ a plurality of transverse tubular members spaced apart throughout the entire length of the frame as the sole tying means for the side rails or channels in conjunction with a novel construction of brackets secured in a novel manner to or between the flanges of the side channels, and in addition I so collocate said tubular members that they are in addition utilized as the supports for the engine, transmission and their adjuncts.

It will be further apparent that the terminals of the transverse tubular members are immovably secured to their brackets and the latter are immovably secured to the side channels, so that a rigid unitary frame is produced, and I also dispense with any intermediate channel transverse members, and the gusset members or special shapes that have to be employed in connection therewith, since my transverse tubular members constitute the sole tying means for the side channels.

It will now be apparent that I have devised a novel and useful vehicle frame which embodies the features of advantage enumerated as desirable in the statement of the invention and the above description, and while I have, in the present instance, shown and described a preferred embodiment thereof which will give in practice satisfactory and reliable results, it is to be understood that said embodiment is susceptible of modification in various particulars without departing from the spirit or scope of the invention or sacrificing any of its advantages.

Having thus described my invention what I claim as new and desire to secure by Letters Patent, is:—

1. In a vehicle frame, a pair of side channels, a plurality of transverse tubular members constituting the sole tying means for said side channels, brackets for each of said tubular members having upper and lower walls and a vertical web, secured to the top and bottom and vertical web of said channels, seats in said brackets for the reception of the ends of said tubular members, and stiffening webs common to the body of said brackets and their seats.

2. In a vehicle frame, a pair of side channels, a plurality of transverse tubular members constituting the sole tying means for said side channels, and brackets secured to said side channels and having seats for the reception of the ends of said transverse tubular members, certain of the latter being of different diameters and positioned out of horizontal alignment, so as to afford clearances for the driving mechanism, and the two centrally disposed tubular members being arranged closer together than the others, so as to afford supporting means for the transmission and its adjuncts.

3. In a vehicle frame, a pair of side channels, a plurality of transverse tubular members constituting the sole tying means for said channel, the second of said tubular members from the front being of greater diameter than the others, and the next pair of tubular members being spaced closer together than the others, so as to afford supporting means for the transmission, and brackets secured to said channels and having seats for the reception of the ends of said tubular members.

4. In a vehicle frame, a pair of side channels, a plurality of transverse tubular members constituting the sole tying means for said channels, and brackets secured to said channels and having seats for the reception of the ends of said tubular members, the seats in certain of said brackets being out of horizontal alignment so as to bring the second tubular member from the front below the driving mechanism, and the third and fourth tubular members from the front above said driving mechanism.

5. In a vehicle frame, a pair of side channels, a plurality of transverse tubular members constituting the sole tying means for said channels, an engine, supporting devices common to said engine and to the front of said tubular members, a transmission, a pair of intermediate tubular members spaced closer together than the others in proximity to said transmission, a supporting device common to the front of said transmission and to the juxtaposed tubular member, a plurality of rear supporting devices clamped to the tubular member in the rear of said transmission and provided with pendant deflected terminals, lugs on the rear of said transmission supported on said terminals, and fastening devices common to said lugs and said rear supporting devices.

6. In a vehicle frame, a pair of side channels, a plurality of transverse, spaced apart, tubular members, constituting the sole tying means for said channels, and having their ends immovably secured with respect thereto, an engine, supporting devices common to said engine and the front of said tubular members, the second of said tubular members being of greater diameter and out of horizontal alignment with said front tubular member, a transmission, a pair of intermediate tubular members, spaced closer together than the others, in proximity to said transmission, and out of horizontal alignment with said second tubular member, front and rear supports common to said transmission and the tubular members in proximity thereto, and a propeller shaft common to said engine and transmission.

JOSEPH F. COLLINS.

Witnesses:
E. HAYWARD FAIRBANKS,
N. BUSSINGER.